Patented Oct. 3, 1939

2,174,551

UNITED STATES PATENT OFFICE 2,174,551

FLUX COMPOSITION

Lionel Cinamon and Samuel Sklarew, New York, N. Y., assignors to Special Chemicals Corp., New York, N. Y., a corporation of New York No Drawing. Application December 30, 1936, Serial No. 118,397

7 Claims. (Cl. 148—26)

Our present invention relates to fluxes, and more particularly to a novel and highly improved flux composition for hard soldering, brazing or welding.

The ideal fluxing agent has a triple function: it covers the brightened metal surfaces to exclude air; acts as a solvent for the metal oxides formed by action of the air; and, as a detergent or coagulant, it cleanses and floats away from the metal surfaces the oxides and other foreign matter present. In addition to these characteristics, it is of industrial importance that the soldering flux have a minimum toxic effect on the mucous membranes of the respiratory and ocular portions of a worker's body. It is one of the main objects of our present invention to provide a flux composition which essentially includes an alkali boro-fluoride and an alkali silico-fluoride as the active ingredients in proportions such as to provide the aforementioned desirable characteristics.

Another important object of this invention is to provide a flux agent including ingredients such as boric acid, an alkali tetra-borate, an alkali fluoride, an alkali acid fluoride and a relatively small percentage of potassium silico-fluoride; the agent being characterized by a complete absence of pitting of the solder after the soldering operation is completed, and the excess flux being readily washed out by hot water.

Still other objects of our invention are to improve generally the efficiency and reliability of fluxes; and more especially to provide a flux agent adapted for soldering, brazing or welding which is not only capable of ready usage by the worker, but is additionally economical in preparation.

In the following detailed description of our invention there are disclosed various fluxing agents embodying the aforesaid characteristics, properties and proportions; however, it is to be clearly understood that specific ingredients, percentages, and temperatures are illustrative, and are capable of a wide range of variation, the scope of which variation is indicated by the claims.

From a generic viewpoint it can be stated that our novel fluxing agent includes boric acid, alkali boro-fluoride and an alkali silico-fluoride. In most cases a soldering flux comprising such ingredients in desired proportions, proves effective as an air excluder, a solvent for metal oxides and as a detergent. However, there are metal oxides which are extremely difficult to remove from their base metals; such metals including stainless steel, nickel, Monel metal, etc. These metals must be etched prior to soldering and for this reason a small quantity of potassium acid fluoride is added. It may, also, be pointed out that the acid fluoride acts on boric acid to produce potassium boro-fluoride, a glass-like material which is a good air-excluder.

In compounding a fluxing agent of this type a minimum of the alkali acid fluoride is employed, since it is definitely toxic and injurious to the respiratory and ocular mucous membranes. In this connection it is pointed out that the potassium silico-fluoride is only mildly injurious to the worker, while the borate and boric acid content are non-injurious. The present composition is maintained substantially alkaline to prevent the liberation of free hydrogen fluoride and silico-fluorides. Those skilled in the art of soldering, brazing and welding are fully acquainted with the precautions that should be taken to guard the worker from any toxic action due to the ingredients of fluxes.

The following specific examples are given of fluxing compositions provided in accordance with our invention:

Example I

| | Parts |
|---|---|
| Boric acid, $H_3BO_3$ | 38.0 |
| Borax, (hydrated), $Na_2B_4O_7.10H_2O$ | 3.8 |
| Potassium silico-fluoride, $K_2SiF_6$ | 50.0 |
| Potassium acid fluoride, $KHF_2$ | 10.0 |
| Water | 23.2 |

In this composition the borax and boric acid form a eutectic mixture of 5% borax and 95% boric acid ($\pm 3\%$); the mixture serving as the carrier, or solvent, for the remaining ingredients. The principal active ingredient is the silico-fluoride; sufficient of the acid fluoride is used to give an ideal flux for stainless steel; the hydrated borax of commerce makes a non-gritty, smooth paste. All the ingredients, save the soluble acid fluoride, should be finely powdered to produce a uniform mix free of lumps. The composition becomes hard on standing, but is readily reduced with water to a smooth, thin paste. It is used in soldering in the well known manner.

The ingredients are adapted to be varied through relatively wide ranges. For example, the boric acid can be varied from 25–55 parts; borax, or equivalent alkali borate, 1–25 parts; potassium silico-fluoride, 0.5–70 parts; potassium acid fluoride, 0–13 parts. Further, any alkali tetraborate can be employed in place of borax; the potassium content of any of the fluoride ingredients can be replaced by any alkali metal, and the potassium silico-fluoride can be replaced by the reaction product of hydrofluosilicic acid and an organic compound, or metallo-organic compound.

The following metals join, with or without solder, very easily and readily to themselves and each other with a flux of the foregoing type; stainless steel; steel; iron; copper; brass; bronze; platinum; gold; silver; Monel metal; nickel; german silver. There are usually difficult metallic materials to join; with the present flux they can be joined with ease. The action of the flux under increasing temperature is markedly satisfactory; at 212° F. action begins on the metal oxide, 785° F. the flux is mushy, at 845° F. it has a syrupy consistency, past 1575° F. it is fluid with no sign of volatilization. The mixture disclosed has a very low vapor tension, even at a temperature of 1570° F., and thus does not lose more than a minute quantity of its volume. Upon cooling from such a temperature the flux forms a continuous glass-like film over the metal surface; the surface, upon removal of the film, is observed to be bright and shiny. It will now be seen that a composition of the type disclosed possesses desirable flux properties: easily reduced to a paste with water; applies to metal in a satisfactory manner; maintains a lower surface tension during soldering; and uniformly coats the metal. It is pointed out that in the above composition there is present as active ingredients alkali boro-fluorides. The latter appear in the mixture as reaction products.

To improve the solubility of excess flux in hot water, after completion of the soldering operation, so as to leave a soldered joint perfectly clean, the following variations in constituents and relative proportions may be made:

*Example II*

| | Parts |
|---|---|
| Boric acid | 51.7 |
| Potassium tetra-borate (anhydrous) | 2.0 |
| Potassium acid fluoride | 10.0 |
| Potassium fluoride (anhydrous; neutral) | 35.3 |
| Potassium silico-fluoride | 1.0 |
| Water | 30.0 |

In a composition of the last named type a maximum quantity of potassium boro-fluoride is formed during the active fluxing; a compound of the latter type probably doing the actual fluxing. The silico-fluoride is present in sufficient quantity to prevent pitting of the solder after the soldering operation is completed. However, the silico-fluoride is not sufficient to interfere with solubility of the flux in hot water; also, the potassium tetra-borate is employed in place of borax to promote such solubility. A flux of this type flows very rapidly on the joint to be soldered; pitting of the solder is avoided; and the excess flux washes out completely leaving the soldered joint clean.

If hydrated salts should be used in place of the anhydrous material, then there are used 4 parts of $K_2B_4O_7.5H_2O$; 52.2 parts of $KF.2H_2O$; 11.1 parts of water. The metallic materials previously enumerated are soldered by this flux. At 785° F. this flux becomes dough-like; at 900° F. it is a liquid; at 1220° F. it spreads relatively fast; even at 1480° F. it is still spreading. Compared to well known fluxes of the boric acid-borax type, this flux melts at a lower temperature; begins its fluxing action at an earlier temperature; and flows much more rapidly along the joint to be soldered.

In compounding this second type of flux, the potassium fluoride and potassium acid fluoride are dissolved in the water; potassium tetra-borate added; and finally the boric acid is added. The mixture is continually stirred. The reaction is exothermic; and the mixture quickly assumes a very fluid state. At this point it is desirable to pour the fluid mixture into containers, and allowed to set. The setting time is about 20 minutes for small batches (as 1 lb.). The mixture is translucent, white and greasy in appearance; upon standing it soon becomes quite hard. The hard mixture, however, easily dissolves in warm water. The commercial usage of this type of flux is substantially the same as that described in connection with the flux known as Example 1.

When economic reasons require it, in place of employing potassium tetra-borate directly in the composition of Example II, the boric acid content thereof and potassium carbonate may be employed to produce the desired tetra-borate. The following composition may then be utilized:

*Example III*

| | Parts |
|---|---|
| Boric acid | 42.10 |
| Potassium carbonate | 1.33 |
| Potassium acid fluoride | 7.7 |
| Potassium fluoride | 27.20 |
| Potassium silico-fluoride | 0.77 |
| Water | 20.90 |

This flux composition has characteristics comparable to those of the Example II composition.

To still further increase the fluxing, wetting, and solubility after soldering, the flux compositions of Example III may have a predetermined quantity of an alkali boro-fluoride added thereto. The following composition may then be employed:

*Example IV*

| | Parts |
|---|---|
| Boric acid | 38.40 |
| Potassium carbonate | 1.30 |
| Potassium acid fluoride | 7.70 |
| Potassium fluoride | 27.20 |
| Potassium silico-fluoride | 0.77 |
| Potassium boro-fluoride, ($KBF_4$) | 4.63 |
| Water | 20.00 |

It is to be understood that the boro-fluoride content may be increased in proportion to the other ingredients. In such case any of the other ingredients may be proportionately decreased, with the exception of the silico-fluoride content. The flux composition of this example, as well as Example III, when compounded is white, translucent, hard and greasy to the touch. However, it is readily soluble in water when it is to be used for soldering, brazing or welding. It is pointed out that in the case of the usage in welding operations, the flux compositions of this invention are applied in a dry, pulverized state.

What we claim is:

1. In combination, a flux whose essential ingredients are boric acid, and alkali borate, potassium silico-fluoride, and an alkali boro-fluoride, the boro-fluoride content predominating over the silico-fluoride content, and the boric acid content predominating over each of the other ingredients.

2. As a flux, the reaction product of the following ingredients; boric acid; an alkali tetra-borate; potassium acid fluoride; potassium fluoride; and potassium silico-fluoride, the concentration of the silico-fluoride content being substantially less than the concentration of any of the other ingredients of said flux.

3. In a flux composition, boric acid, an alkali tetraborate; an alkali acid fluoride; and an alkali silico-fluoride; and the proportions of said ingredients being chosen to prevent pitting of the soldered joint, and to increase the solubility of the flux in hot water, the boric acid content predominating over the other ingredients, said silico-fluoride being present in less amount than the acid fluoride content.

4. In a flux composition, in combination, an alkali boro-fluoride and alkali silico-fluoride and the concentration of the silico-fluoride content being less than the concentration of the boro-fluoride content.

5. In a flux composition of the type including alkali boro-fluoride, an alkali silico-fluoride in an amount chosen from a range of substantially 0.4% to 56% of said composition, the solubility of said composition varying inversely as the ratio of the silico-fluoride to the boro-fluoride, and the melting point of said composition varying directly with said ratio.

6. In a flux composition, the combination of boric acid; alkali fluoride; alkali silico-fluoride; and alkali boro-fluoride; the concentration of the boric acid content of the composition predominating over each of the other ingredients; and the boro-fluoride content exceeding the silico-fluoride content.

7. A flux composition comprising from about 20% to 44% of boric acid, an alkali acid fluoride and alkali silico-fluoride, the concentration of said alkali silico-fluoride being less than the concentration of said boric acid.

LIONEL CINAMON.
SAMUEL SKLAREW.